(12) United States Patent
Lu

(10) Patent No.: US 6,170,120 B1
(45) Date of Patent: Jan. 9, 2001

(54) NOTEBOOK COMPUTER HINGE

(76) Inventor: Sheng-Nan Lu, No. 174, Chunying St., Shulin Chen, Taipei Hsien (TW)

( * ) Notice: Under 35 U.S.C. 154(b), the term of this patent shall be extended for 0 days.

(21) Appl. No.: 09/332,762

(22) Filed: Jun. 14, 1999

(51) Int. Cl.[7] ................................................. E05C 17/64
(52) U.S. Cl. ................................. 16/342; 16/337; 16/331; 361/681
(58) Field of Search ............................. 16/342, 337, 331, 16/338, 339, 307, 306, 352, 353, 316, 328, 329, 330, 332; 361/681, 682

(56) References Cited

U.S. PATENT DOCUMENTS

| 5,566,048 | * | 10/1996 | Esterber et al. | ..................... | 361/681 |
| 5,715,576 | * | 2/1998 | Liu | ........................................ | 16/342 |
| 5,896,622 | * | 4/1999 | Lu | ........................................... | 16/342 |
| 5,949,642 | * | 9/1999 | Park | ..................................... | 361/681 |

* cited by examiner

Primary Examiner—Anthony Knight
Assistant Examiner—E Peavey
(74) Attorney, Agent, or Firm—Dorsey & Whitney LLP

(57) ABSTRACT

A hinge for a notebook computer has a pivotal bearing seat with one or two springs received therein, a limit plate and a pivot, wherein the pivotal bearing is securely attached to the main body of the computer and defines a bearing hole therein with a transversal groove defined to communicate with the bearing hole to hold the springs. The pivot has one end securely attached to the screen of the computer and the other end forms a spindle with lubricating slots defined thereon. The spindle is inserted through the limit plate and into the bearing hole of the springs, whereby the screen of the notebook computer can be held at any angle with respect to the main body when open.

11 Claims, 11 Drawing Sheets

NOTEBOOK COMPUTER HINGE

BACKGROUND OF THE INVENTION

1. Field of the Invention

The present invention relates to a hinge for a notebook computer, particularly to a hinge comprising a pivotal bearing seat with a set of spring devices received therein, a limit plate and a pivot, which is either rotatable or fixable reversibly in a position in a pivot socket defined in the spring devices.

2. Description of Related Art

Because the notebook computers are highly mobile and efficient in handling business matters, the number of people who use notebook computers is increased. Furthermore, the development of internet even promotes the use of notebook computers. In order to meet the requirements under all circumstances, a hinge device pivotally connected between the screen and the body is necessary to provide substantial and suitable support to the screen, such that the screen is able to be opened from the body at any desired angle hinge device. However, the conventional hinge devices for notebook computers generally comprise a pivotal bearing seat with a transversal or a longitudinal spring piece provided therein, which incurs drawbacks:

1. The structure of the conventional hinge devices using two different spring pieces are complex and the fabrication cost is high;
2. The support provided by the spring pieces to the screen is not strong enough. Therefore, the screen may not be securely fixed at a desired angle.

SUMMARY OF THE INVENTION

The main object of the present invention is to provide a hinge device for a notebook computer. The hinge device comprises a pivotal bearing seat with spring devices received therein, a limit plate and a pivot. With such an arrangement, the screen has support in the opening direction and the closing direction. What's more is that the fabrication cost of the hinge device is greatly reduced. Hinge device The detailed features of the present invention will be apparent in the detailed description with appropriate reference to the accompanying drawings.

DETAILED DESCRIPTION OF PREFERRED EMBODIMENT

Figure 1:
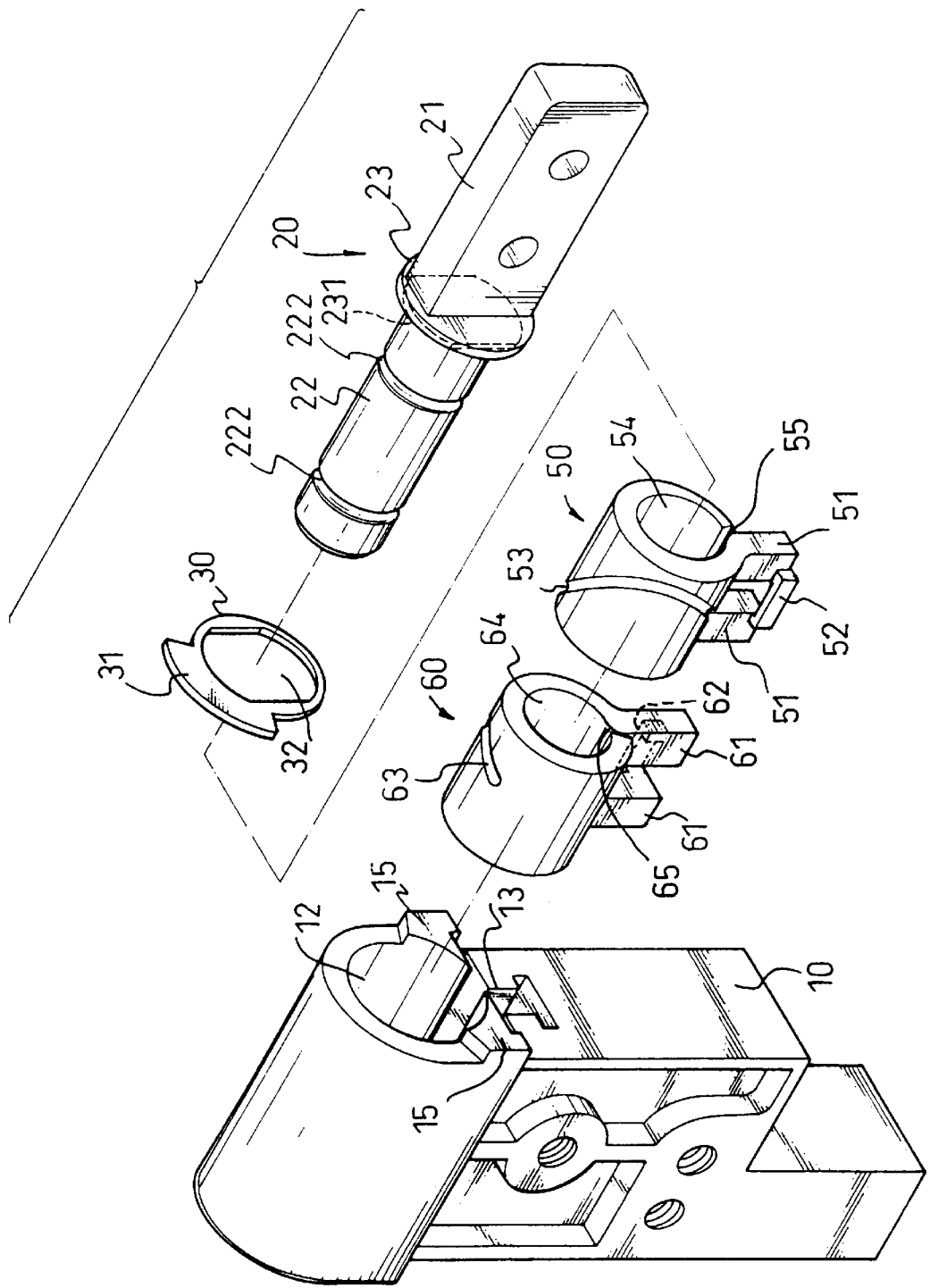
FIG. 1 is an exploded perspective view of a hinge in accordance with the present invention.
Figure 2:
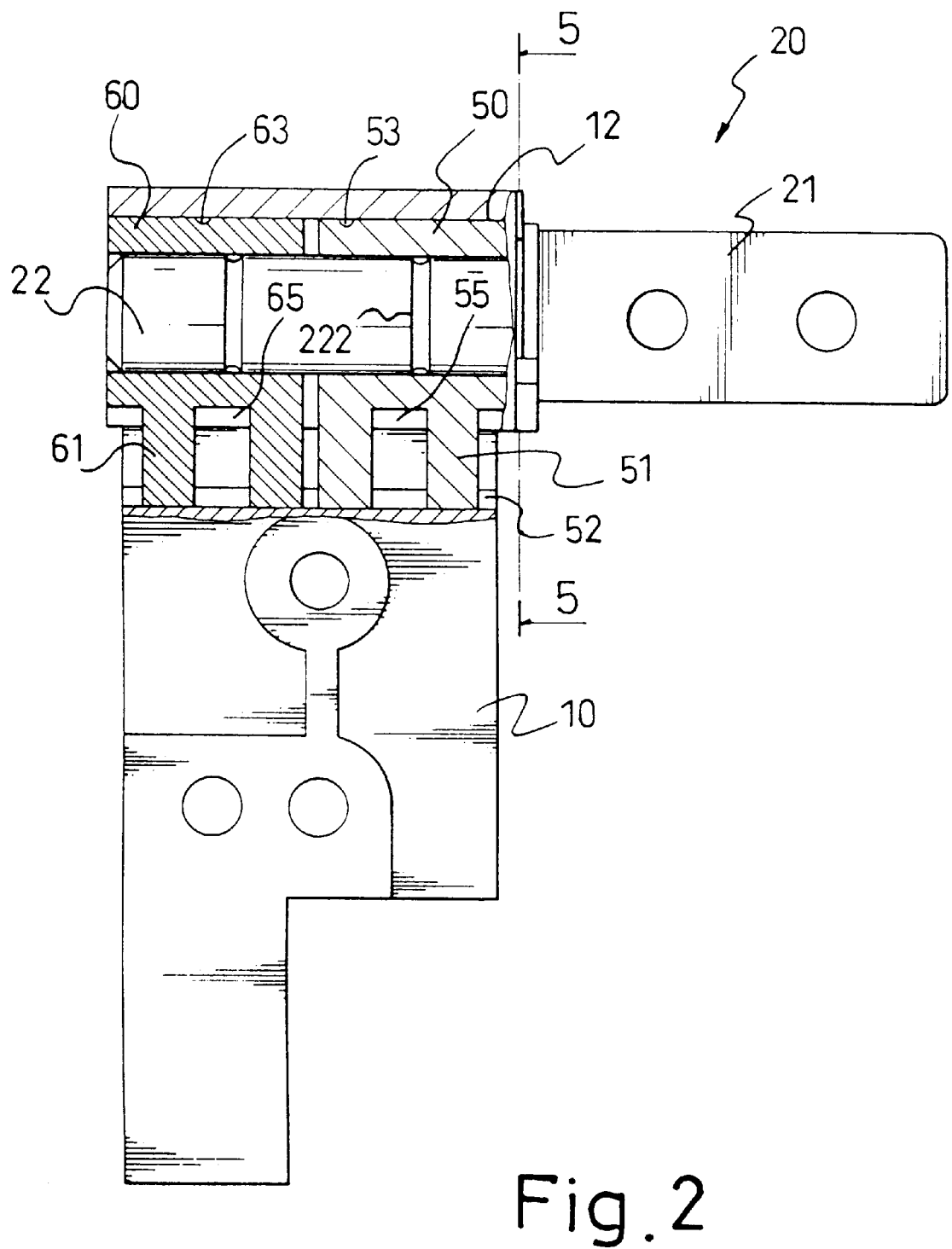
FIG. 2 is a side view in partial section of the hinge, in FIG. 1; hinge device
Figure 3:
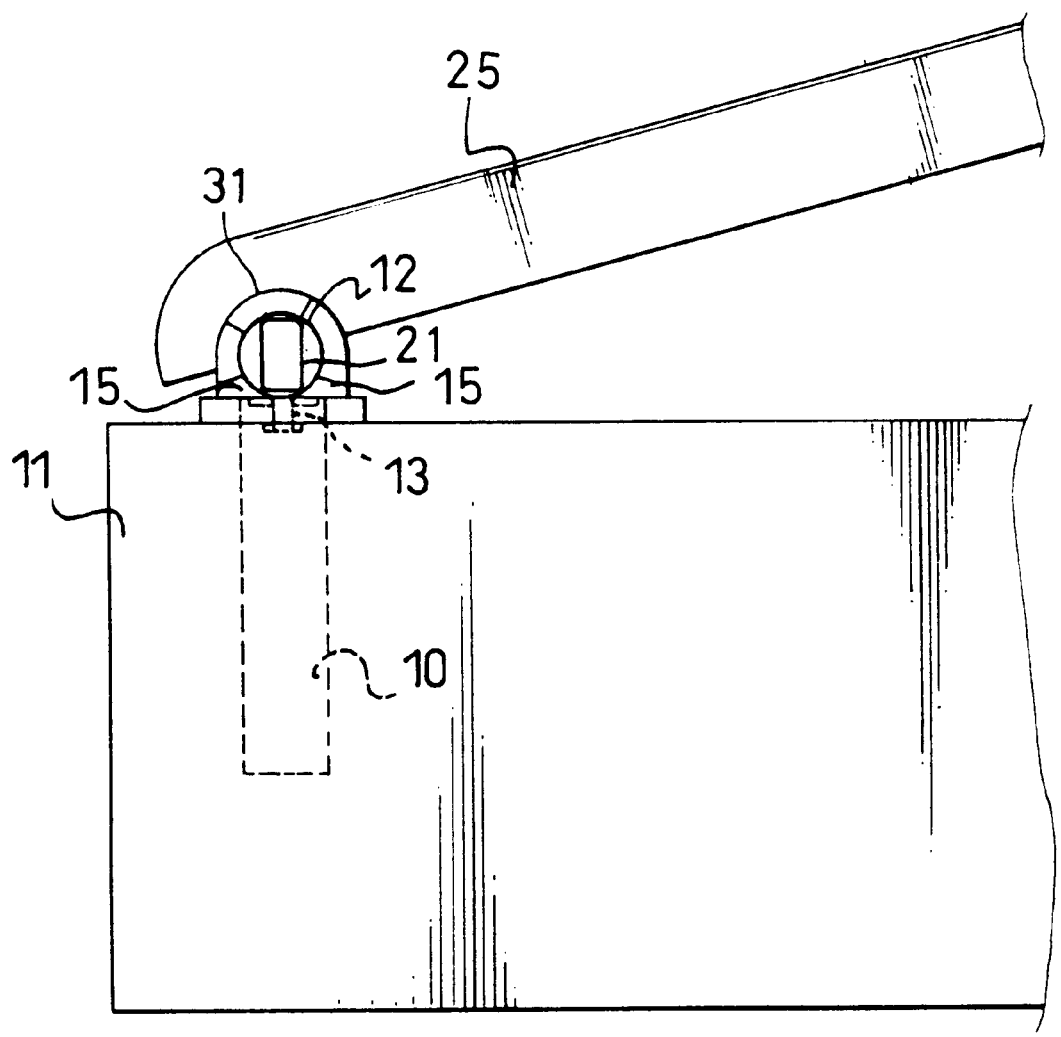
FIG. 3 is a side view of the hinge in FIG. 1 installed in a notebook computer.

As shown in FIGS. 1 to 3, a hinge in accordance with the present invention comprises a pivotal bearing seat (10) with spring devices received therein, a pivot (20) and a limit plate (30).

The pivotal bearing seat (10) is securely attached to the main body (11) of a notebook computer and defines a bearing hole (12) through the pivotal bearing seat (10) and a transverse H-shaped groove (13) defined to communicate with the bearing hole (12). Two limit blocks (15) are integrally formed on opposite sides of the open end of the bearing hole (12).

The spring device include a first spring (50) and a second spring (60). The first spring (50), which is a hollow tube, has two legs (51) integrally extending outward therefrom, a block (52) securely connected to both legs (51), a lubricating groove (53) defined on the outside surface, a first through hole (54) defined therethrough and a slit (55) axially defined therein. The second spring (60) is a mirror image of the first spring (50) with two legs (61), a block (62)securely connected with both of the legs (61), a lubricating groove (63)peripherally defined therein, a second through hole (64) defined therethrough and a slit (65) axially defined therein. The blocks (52, 62) are attached to the respective pair of legs (51, 61) on opposite sides and the slits (55, 65) are on opposite sides, such that the first spring (50) and the second spring (60) are able to provide support in opposite directions.

The pivot (20) has an extension (21) integrally formed on one end to attach the screen (25) of the computer and a spindle (22) formed on the other end with multiple lubricating slots (222) defined therein. A shoulder ring (23) is integrally formed between the extension (21) and the spindle (22). The shoulder ring (23) further integrally forms a chamfered boss (231) towards the spindle (22).

The limit plate (30) integrally forms a sectional portion (31) and defines a chamfered hole (32) corresponding to the chamfered boss (231) of the spindle (20), so as to allow the chamfered boss (231) to be received in the chamfered hole (32).

Figure 4:
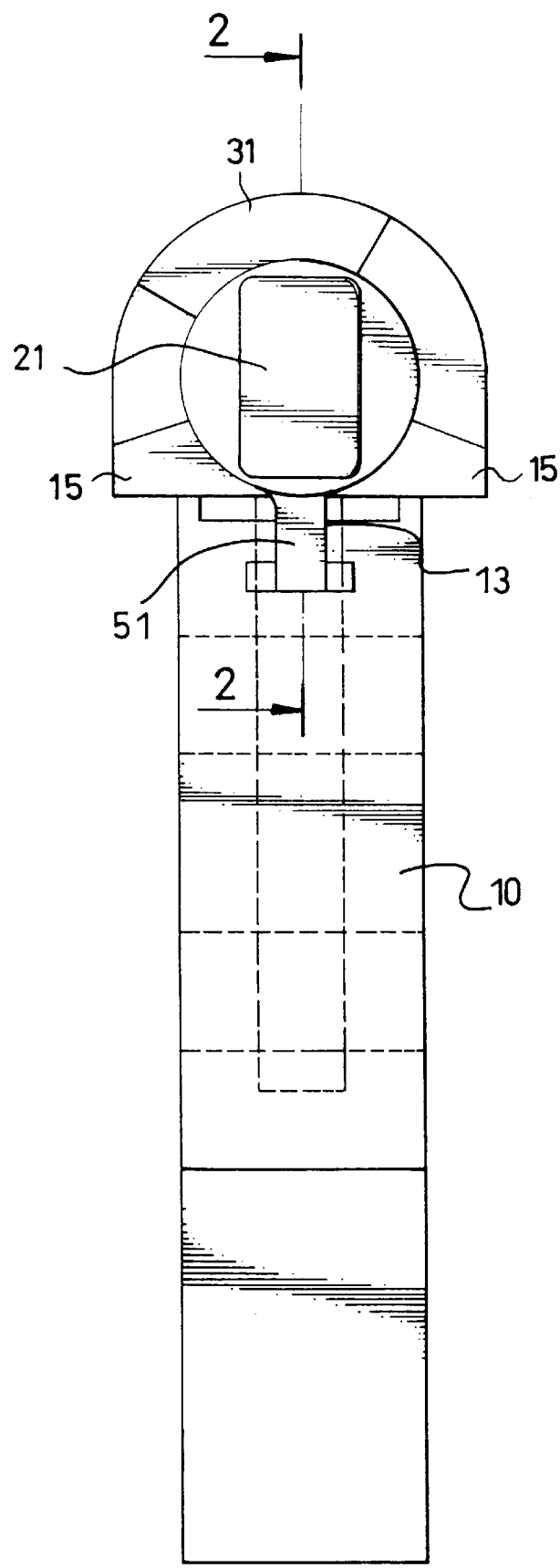
FIG. 4 is a side plan view of the hinge in FIG. 1.

During assembly, the first spring (50) and the second spring (60) are first inserted into the bearing hole (12) of the bearing seat with the blocks (52, 62) received in the T-shaped groove (13). The spindle (22), after being inserted through the chamfered hole (32) of the limit plate (30) (as shown in FIG. 4), is then inserted into the first through hole (54) and the second through hole (64) to have an interference fit with the peripheries defining the first through hole (54) and the second through hole (64).

Figure 5:
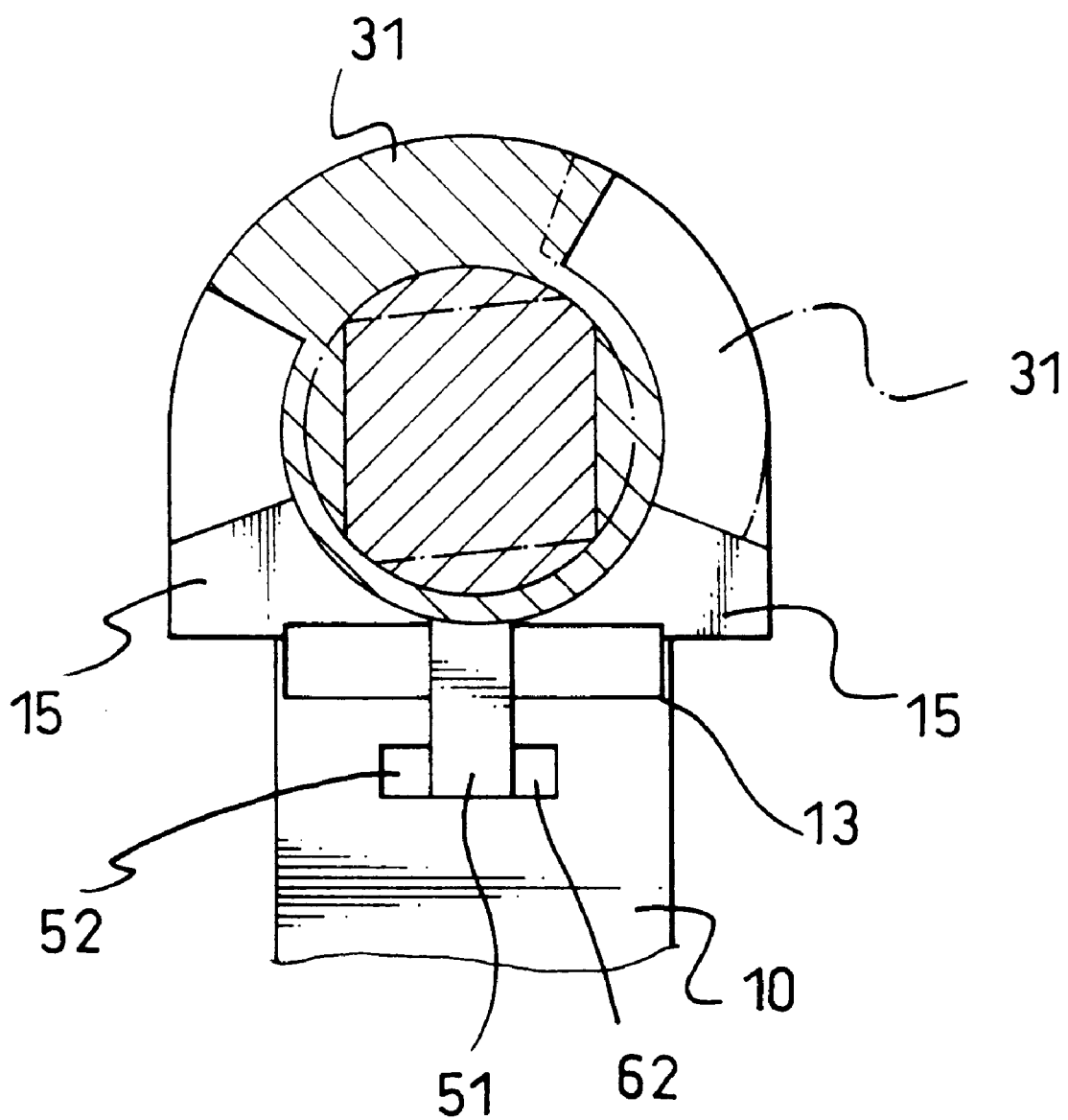
FIG. 5 is an enlarged cross sectional view of the hinge along the line 5—5 in FIG.2.
Figure 6:
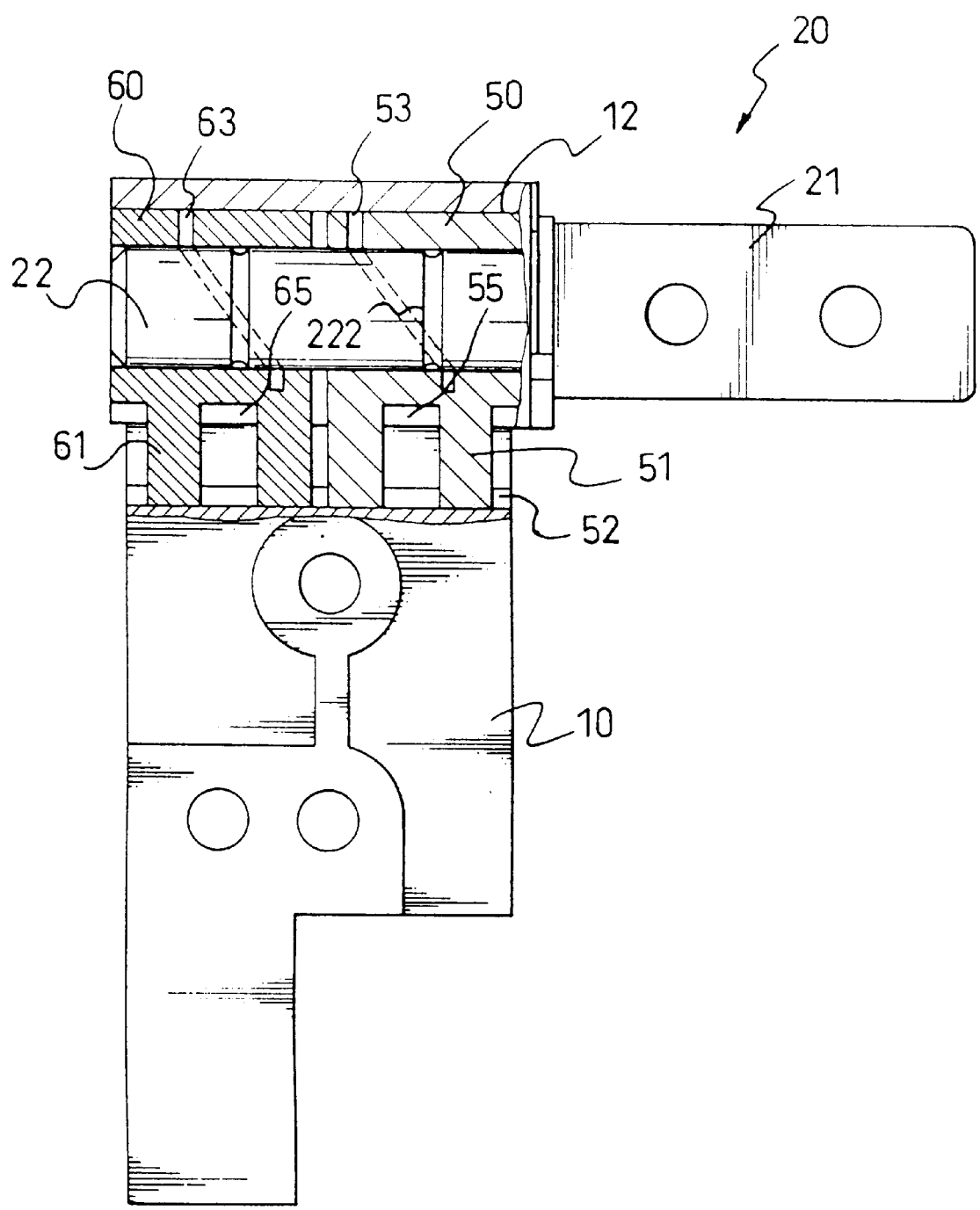
FIG. 6 is a front plan view in partial section showing alternative oil slots defined in the hinge in FIG. 1.
Figure 7:
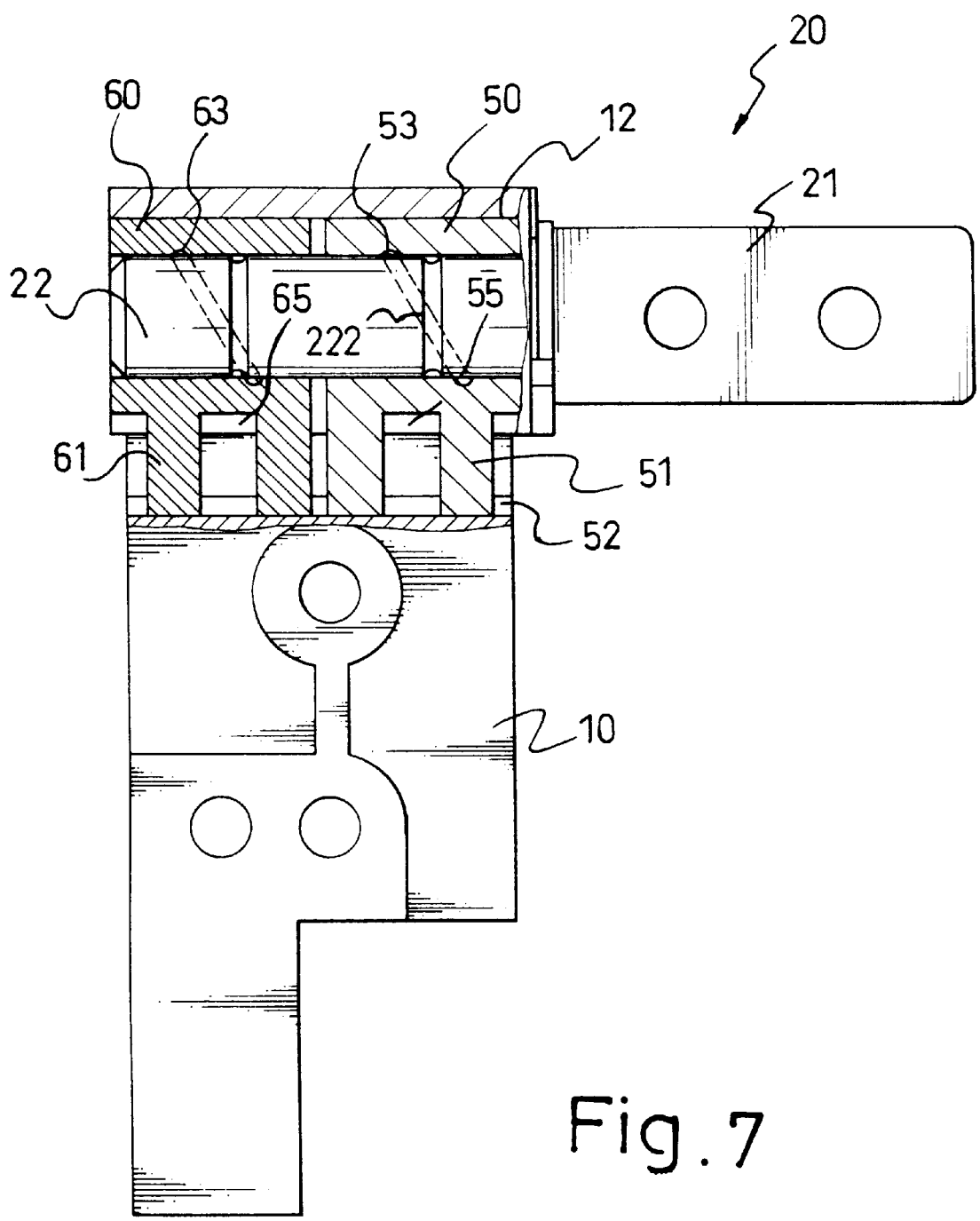
FIG. 7 is a front plan view in partial section showing oil slot different from that shown in FIG. 6.

Referring to FIG. 5, after the assembly of the hinge is complete, the limit plate (30) is still pivotal on the spindle (22). However, due to the limit blocks (15) beside the bearing hole (12), the pivotal movement of the limit plate (30) is limited to correspond to the opened and closed angles of the screen (25) with respect to the main body (11). FIGS. 6 and 7 show that the lubricating grooves (53, 63) of the first spring (50) and the second spring (60) can be defined through the respective periphery thereof or defined superficially in the respective periphery thereof.

Figure 8:
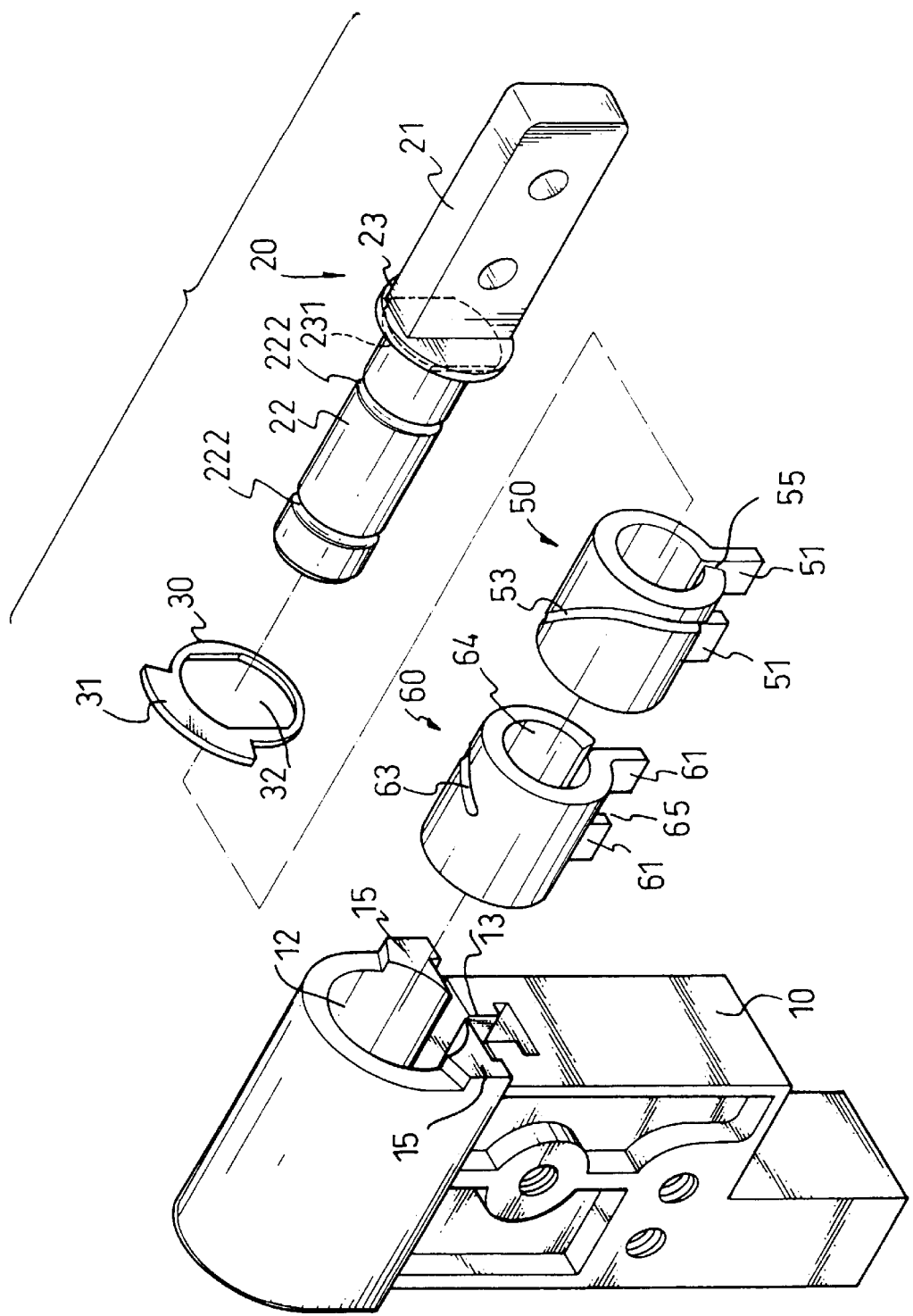
FIG. 8 is an exploded perspective view of a second embodiment of the hinge in accordance with the present invention.
Figure 9:
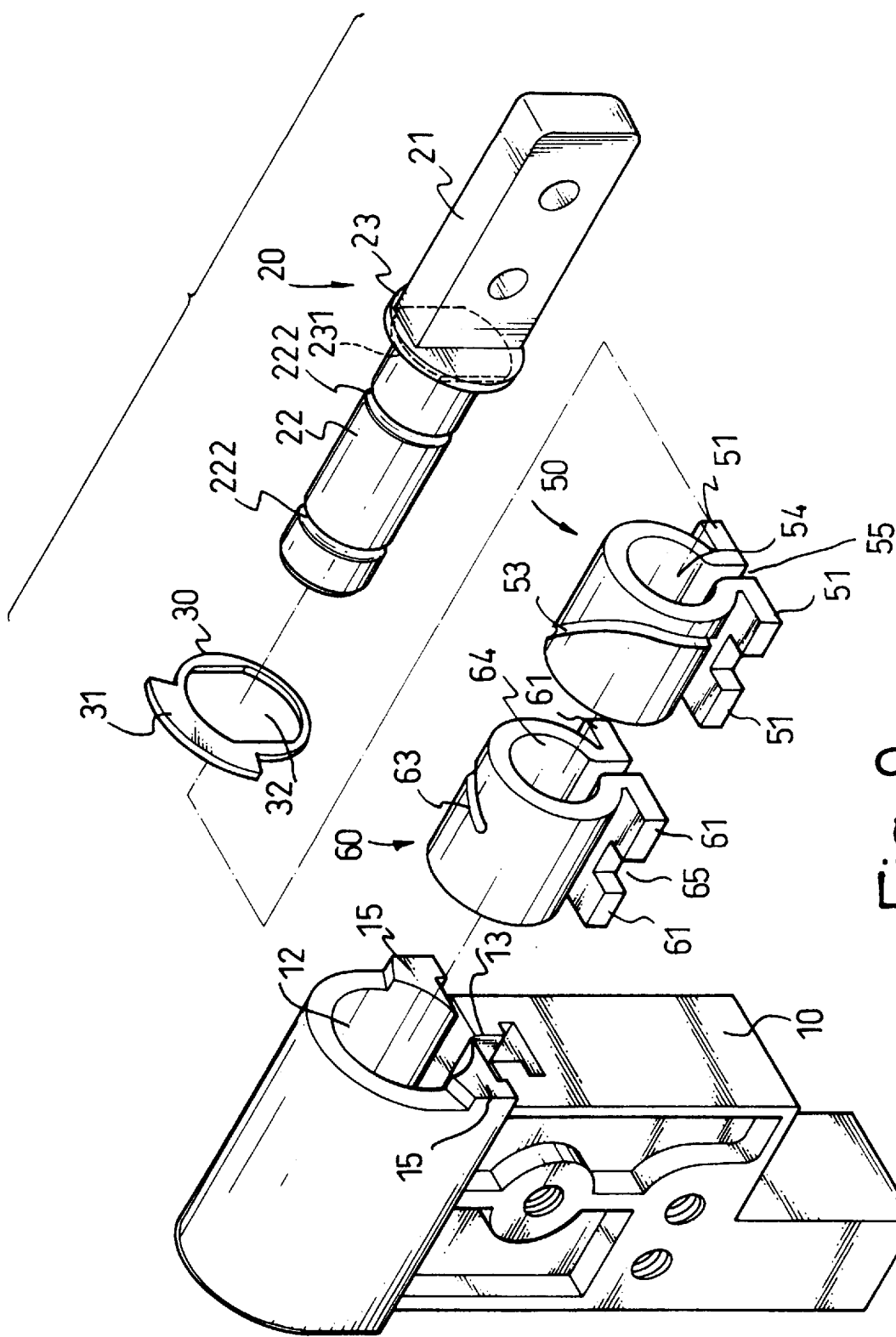
FIG. 9 is an exploded perspective view of a third embodiment of the hinge in accordance with the present invention.
Figure 10:
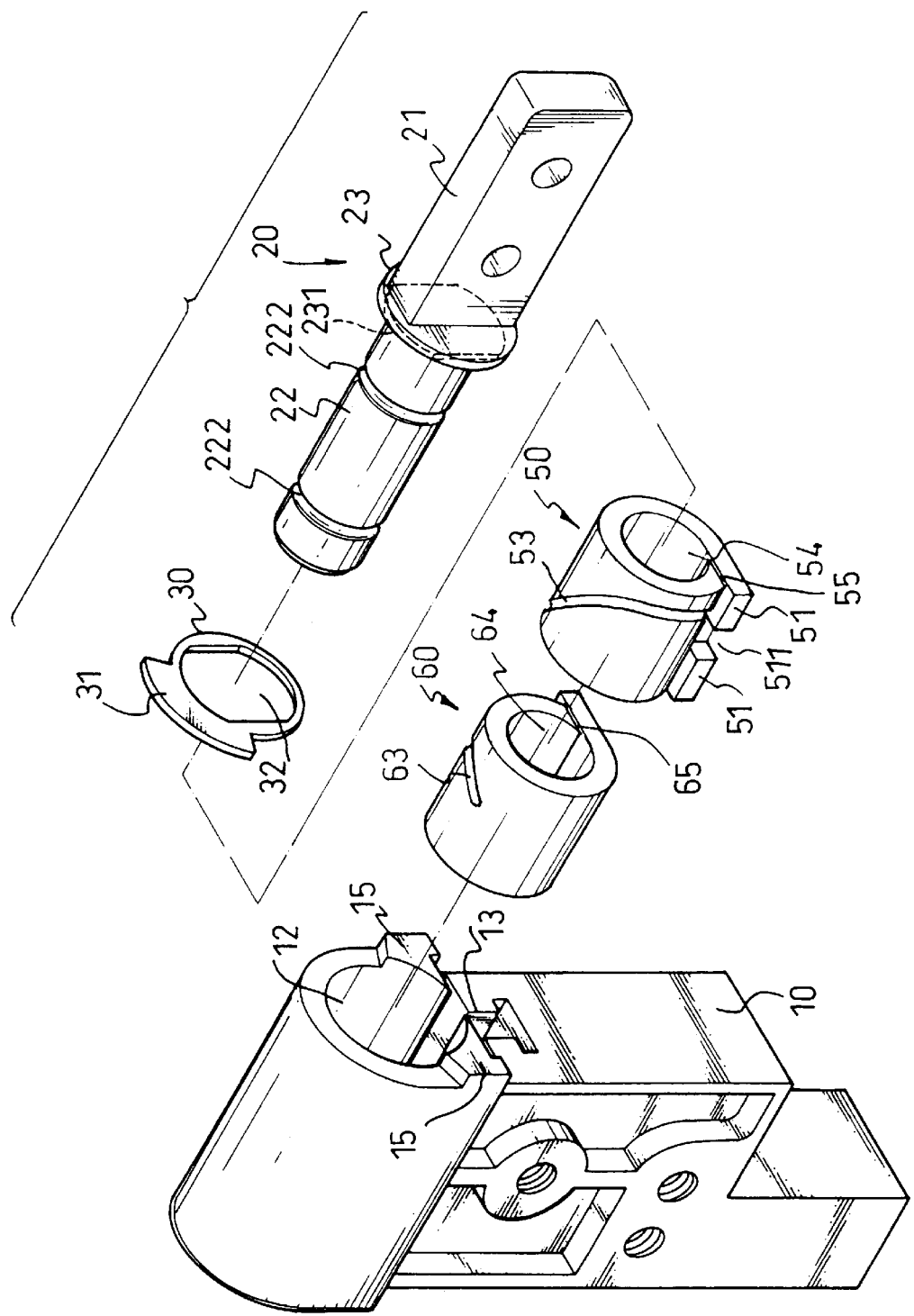
FIG. 10 is an exploded perspective view of a forth embodiment of the hinge in accordance with the present invention.
Figure 11:
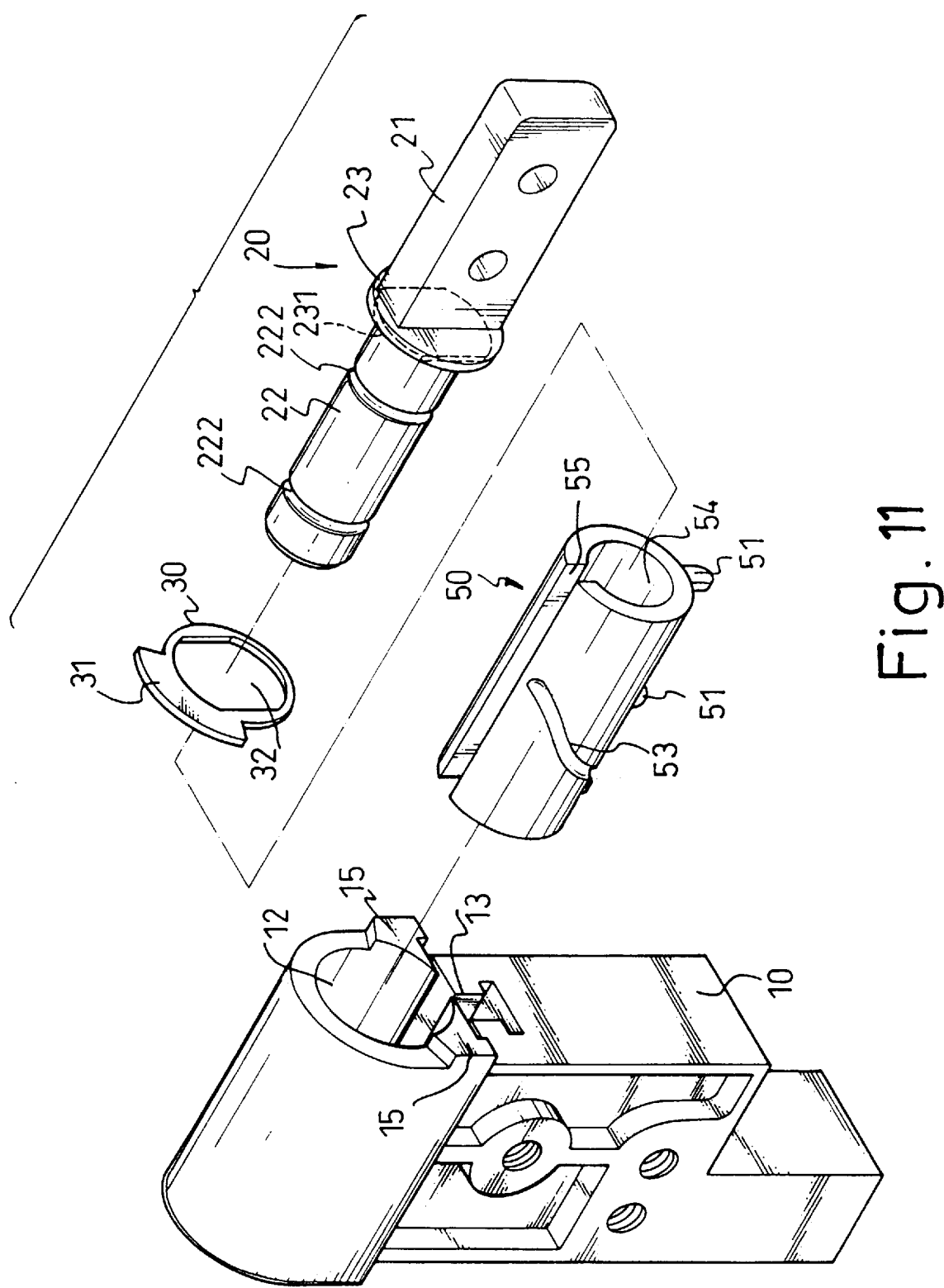
FIG. 11 is an exploded perspective view of a fifth embodiment of the hinge in accordance with the present invention.

Referring to FIGS. 8, 9, 10 and 11, the differences among the embodiments shown in the drawings is primarily in the form of the legs (51, 61). As shown in FIG. 8, the first and second springs (50, 60) can still be securely seated in the bearing hole (12) of the bearing seat (10) without the blocks (52, 62). As seen in FIG. 9, the shape of the first spring (50) and the second spring (60) is similar to an "Ω". Both the first spring (50) and the second spring (60) have two pairs of legs (51, 61). Each pair of the legs (51, 61) extends in opposite directions. Furthermore, due to the formation of the legs (51, 61), the slits (55, 65) are respectively defined between the two pairs of legs (51, 61). As seen in FIG. 10, the first spring (50) and the second spring (60) have one leg (51, 61) and a cutout (511) defined in the face of the leg (51, 61). As shown in FIG. 11, only the first spring (50), which has two legs (51), exists to accomplish the aforesaid function, and the slit (55) is defined in a periphery thereof hinge device.

What is claimed is:

1. A hinge for a notebook computer comprising a pivotal bearing seat (10) for securely attaching the hinge to the main body of a computer and having a bearing hole (12) defined therethrough, a groove (13) defined to communicate with the bearing hole (12) and two limit blocks (15) respectively formed on opposite sides of the bearing hole (12);

at least one hollow spring (50) having two legs (51) integrally formed therewith and received in the groove (13), a lubricating groove (53) defined in the outside surface thereof, a through hole (54) defined therethrough and a slit (55) peripherally and axially defined therein;

a pivot (20) having an extension (21) formed on one end for securely attaching to the screen of the computer, a spindle (22) formed on the other end to be received in the bearing hole (12) of the bearing seat (10) and having multiple lubricating slots (222) defined to communicate with the groove (53) of the spring device (50), a shoulder ring (23) integrally formed on the joint of the spindle (22) and the extension (21) and having a chamfered boss (231); and a limit plate (30) situated between the spring device (50) and the shoulder ring (23) of the pivot (20) and having a sectional portion (31) for alternatively abutting one of the blocks (15) and a chamfered hole (32) defined to allow the spindle (22) to be inserted therethrough and the chamfered boss (231) to be received therein for securing the limit plate (30).

2. The hinge as claimed in claim 1, wherein a block (52) is formed between the legs (51).

3. The hinge as claimed in claim 2, wherein a second spring (60) is inserted in the bearing hole (12) and has a pair of legs (61) extending therefrom, a block (62) formed between the legs (61), a groove (63) defined to correspond and communicate with the lubricating slots (222), a through hole (64) defined to correspond to the through hole (54) of the first spring (50) and a slit (65) defined to communicate with the through hole (64) and correspond to the slit (55) of the first spring (50).

4. The hinge as claimed in claim 3, wherein the blocks (52, 62) of the first spring (50) and the second spring (60) are respectively formed on opposite sides of the legs (51, 61) with respect to each other.

5. The hinge as claimed in claim 3, wherein the lubricating groove (63) is defined in the surface of the spring.

6. The hinge as claimed in claim 3, wherein the lubricating groove (63) is defined completely through the hinge from the outer surface to the inner surface.

7. The hinge as claimed in claim 3, wherein the spring (60) is shaped like an Ω.

8. The hinge as claimed in claim 3, wherein the blocks (52, 62) are received in the groove (13) of the bearing seat (10).

9. The hinge as claimed in claim 1, wherein the lubricating groove (53) is defined in the surface of the spring.

10. The hinge as claimed in claim 1, wherein the lubricating groove (53) is defined completely through the hinge from the outer surface to the inner surface.

11. The hinge as claimed in claim 1, wherein the spring (50) is shaped like an Ω.

* * * * *